United States Patent [19]
Hancock et al.

[11] Patent Number: 5,847,367
[45] Date of Patent: Dec. 8, 1998

[54] CIRCUIT ARRANGEMENT FOR CONTROLLING THE TEMPERATURE OF A HEATING ELEMENT

[75] Inventors: Philip T. Hancock, Pasadena; John S. Crawford, Walkerville, both of Australia

[73] Assignee: U.S. Philips Corporation, New York, N.Y.

[21] Appl. No.: 873,204

[22] Filed: Jun. 11, 1997

[30] Foreign Application Priority Data

Jun. 13, 1996 [AU] Australia ............................... P00438

[51] Int. Cl.⁶ ............................................... H05B 1/02
[52] U.S. Cl. ........................... 219/499; 219/501; 219/481; 219/505; 307/117
[58] Field of Search ................................ 219/505, 501, 219/497, 499, 508, 509, 216, 481; 307/117

[56] References Cited

U.S. PATENT DOCUMENTS

| | | | |
|---|---|---|---|
| 3,789,190 | 1/1974 | Orosy et al. | 219/497 |
| 3,924,102 | 12/1975 | Hanekom. | |
| 4,086,466 | 4/1978 | Scharlack | 219/494 |
| 4,590,363 | 5/1986 | Bernard | 219/497 |
| 4,778,980 | 10/1988 | Rathbun | 219/499 |
| 5,120,936 | 6/1992 | Shyu et al. | 219/497 |
| 5,359,178 | 10/1994 | Kotani et al. | 219/486 |
| 5,464,965 | 11/1995 | McGregor et al. | |

*Primary Examiner*—Mark H. Paschall
*Attorney, Agent, or Firm*—Laurie E. Gathman

[57] ABSTRACT

The temperature of a heating element (3), which heating element has a temperature dependent resistance, is measured by comparing the current through it with a user adjustable reference value. The AC voltage across a current sensing resistor (7) in series with the heating element (3) is compared in a comparator (9) with a reference AC voltage generated at a tap (6) of a voltage divider (8). The phase of the logic output signal of the comparator (9) indicates a first state in which the heating element (3) is too hot or is not conducting, or a second state in which the heating element (3) is too cold and conducting. A second comparator (16) detects whether or not the heating element (3) is conducting. A logic gate (18) and a latch (17) switch on the current through the heating element (3) in response to timed pulses from a timing circuit (15) and switch off the current through the heating element (3) when the heating element (3) is conducting and too hot.

7 Claims, 2 Drawing Sheets

CIRCUIT ARRANGEMENT FOR CONTROLLING THE TEMPERATURE OF A HEATING ELEMENT

BACKGROUND OF THE INVENTION

The present invention relates to a circuit arrangement for controlling the temperature of a heating element.

It is known to use time proportional or on/off triac circuit arrangements for controlling the temperature of heating elements in hotplates, frypans, irons and the like. In these circuit arrangements the temperature of the heating element is sensed by a separate negative temperature coefficient (NTC) or a separate positive temperature coefficient (PTC) thermistor thermally coupled to the object to be controlled. Effective thermal coupling between the sensor and the heating element is difficult to achieve in high temperature applications and improper thermal coupling results in large temperature errors.

U.S. Pat. No. 4,590,363 discloses a circuit for controlling the operating temperature of a heating element of an electric soldering iron. In this circuit the heating temperature is determined solely by measuring the resistance of the heating element itself. In order to achieve this the resistance of the heating element has a positive temperature coefficient. Thus there is no need for a separate thermocouple sensor. In this circuit when the temperature of the heating element becomes too hot, the triac switches off the alternating current flowing through the heating element. When this occurs it is not possible to subsequently measure the temperature of the heating element. In order to subsequently measure the temperature the circuit has a timer which periodically switches on the triac and heating element for a fixed minimum period of 15 cycles of the AC mains. At the expiration of that fixed minimum time (if the temperature is now too low) the triac will be held conducting by the circuit. When the heating element has reached the pre-set temperature the circuit will switch off the triac after a further delay period. The circuit has time constants in the heating element sensing arrangement that require a relatively long time application of alternating current to the heating element in order to get a measure of the heating element o temperature. Indeed the circuit drives the heating element on for at least 25% of the total cycle timer repetition period resulting in temperature overshoot. Whilst such temperature overshoot may be acceptable or even desirable in soldering irons, it is not acceptable in other applications such as stoves. Moreover the circuit is not readily adapted to applications which are powered directly from the ac mains supply because the triac is allowed to half wave rectify the heater current at the start of each minimum heating period.

SUMMARY OF THE INVENTION

The object of the invention is to provide an alternative circuit arrangement which minimizes the aforesaid disadvantages of known circuits for controlling the temperature of a heating element, the resistance of which heating element is a function of its temperature in the novel circuit arrangement an alternating current mains supply is coupled to the heating element via a switching means, and a switch control circuit having an output coupled to the switching means. The switching means conducts the alternating current to the heating element when the switch control circuit is in an ON state and does not conduct when the switch control circuit is in an OFF state. Current sensor means coupled to the heating element supplies at an output thereof an alternating voltage, which is dependent on the alternating current passing through the heating element. Scaling means, adjustable by a user to select a desired temperature of the heating element supplies at an output thereof an alternating voltage, which is dependent on the temperature selected by the user. A timing circuit supplies timing pulses having a predetermined pulse duration and period. A first detector means having respective inputs coupled to the outputs of the current sensor means and the scaling means and adapted to supply a first logic control signal when the temperature of the heating element exceeds the temperature set by the user, and a second detector means supplies a second logic control signal when said alternating current is supplied to the heating element. A logic circuit is adapted to set the switch control circuit to the ON state in response to said timing pulses and to reset the switch control circuit to the OFF state in response to the logic AND combination of the first and second logic control signals.

One advantage of the invention is that it lends itself to many different applications such as stoves, heaters, soldering irons etc. having different thermal constants, without major modifications to the circuit arrangement. All that is required is a change of the pulse period and if necessary a change in the pulse duration to meet the applications requirements. In particular the time required for measuring the temperature of the heating element can be chosen from below 1% of the pulse period to over 25% of the pulse period, depending on the applications' requirements. This flexibility is achieved in the present invention by the circuit obtaining information regarding the state of the heating element by means of the first and second detectors and feeding this information together with the timing information to the logic means to control the switch control circuit. Another advantage of the invention is that any spurious signals outputted from the first detector during any time the switch and heating element are not conducting, due to any delays in the operating time of the switching means, do not effect the state of the switch control circuit. This is achieved by the second detector only outputting a second control signal during the time the switch and heating element are conducting. A still further advantage of the invention is that it is not mandatory for the switch and heating element to be held on for a predetermined fixed duration. This is achieved by the pulse turning on the switch control circuit and the switch control circuit remaining on, even if the pulse ceases. The switch and heating element turning off only once the circuit senses the temperature of the heating element exceeds the temperature set by the user. As a consequence the pulse duration can be very brief.

In an embodiment of the present invention it is preferable that the pulse duration is less than one cycle of the AC mains. In this embodiment, the pulse duration may be very short indeed, even microseconds. In practice the smallest "on" time of the switch and heating element is limited only by the time it takes for the first and second detector means to process the alternating voltages and supply the first and second control signals. In one preferred embodiment of the invention the smallest time the first and second detector means take to process and output the first and second control signal is less than one cycle of the AC mains. Accordingly it is possible to get 1% or smaller percentage "on" time of the total timer pulse period. Such a small "on" time and precise processing of the sensing signal will substantially reduce temperature overshoot and broaden the scope of applicability to other heating element systems.

In a further embodiment of the circuit arrangement, the logic circuit comprises an AND gate having one input coupled to the first detector means for receiving the first logic control signal and having another input coupled to the second detector means for receiving the second logic control signal, a logic latch having a reset input coupled to the output of said AND gate and having a set input coupled to the timing circuit for receiving said pulses.

In a still further embodiment of the invention the circuit arrangement comprises a wheatstone bridge powered by the alternating current mains supply and the bridge balance point is equivalent to said temperature selected by the user, the first branch of the bridge comprises the heating element and the switching means, the second branch of the bridge comprises the current sensor means, the third branch of bridge comprises a variable resistor of the scaling means, and the fourth branch of the bridge comprises a further resistor of the scaling means, wherein one input of said first detector is coupled to the junction of the third and fourth branches and the other input of the first detector is coupled to the junction of the first and second branches, the latter coupling point in the circuit serving as a common reference point. This reference point serving conveniently as a common reference connection for connection of the control sensing circuits and the switch control circuit. In this way one of the differential junctions or nodes of the bridge can become equal to the common reference and there is in effect one less signal to deal with. The first detector means now receives only a single input signal which is the vector sum of the outputs of the current sensor and the scaling means. This can save one input connection pin on an integrated IC and can simplify the control circuit because this vector sum has zero value when the bridge is balanced and changes phase by 180 degrees with respect to the mains voltage according to whether the heating element temperature is above or below the set temperature. Furthermore this embodiment of the circuit arrangement has the advantage of not being influenced by variations in the mains voltage.

In a further embodiment of the circuit arrangement, the first detector means comprises a phase comparator having respective inputs coupled to the outputs of the current sensor means and scaling means and adapted to supply a first logic control signal when the temperature of the heating element exceeds the temperature set by the user.

BRIEF DESCRIPTION OF THE DRAWINGS

Embodiments of the invention will now be described in more detail, by way of example, with reference to the accompanying Figures.

Figure 1:
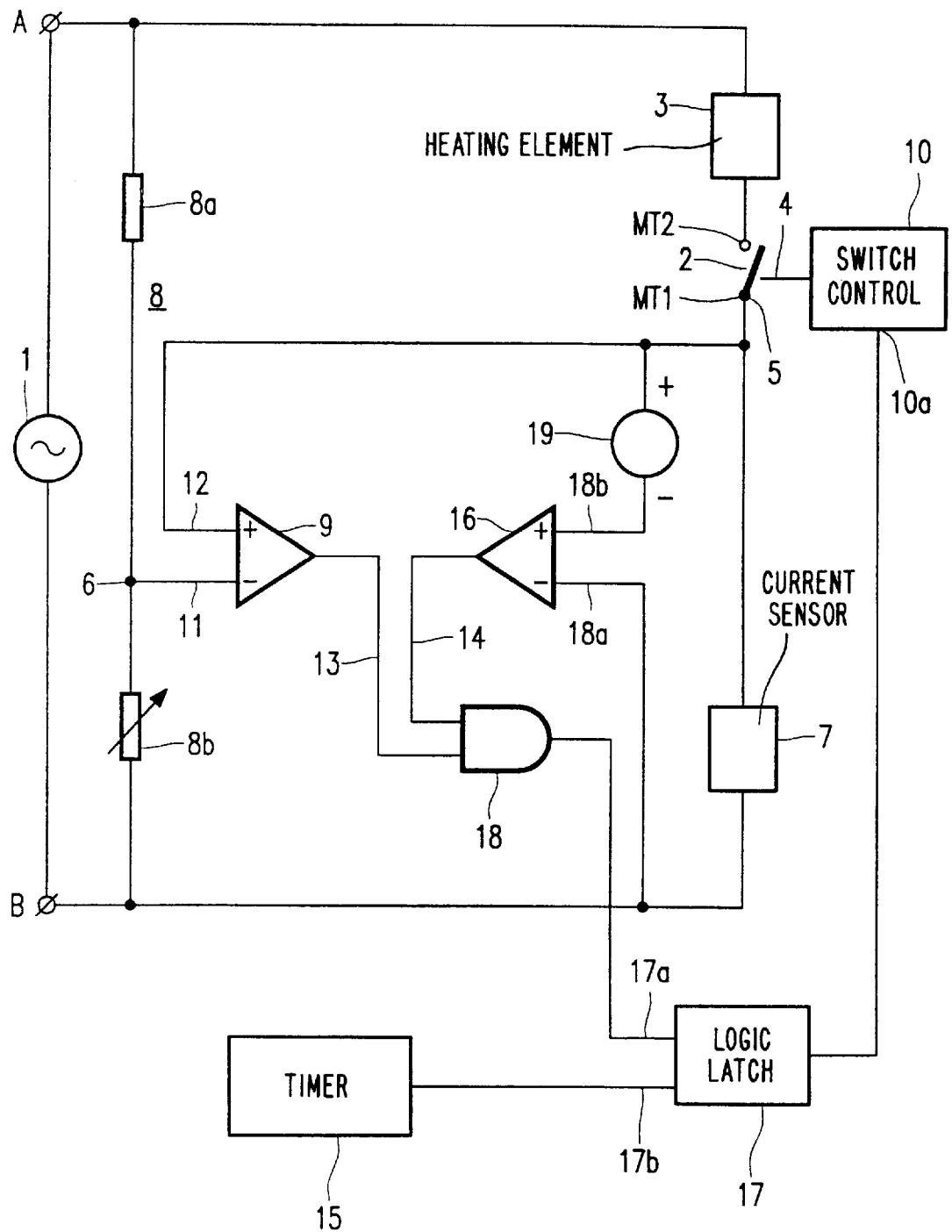
FIG. 1 is a block schematic diagram of a circuit arrangement according to the invention.

In the circuit arrangement shown in FIG. 1, an alternating current mains supply 1 is connected between a terminal A and a terminal B for supplying power to the circuit arrangement. The circuit has a switching means 2 which can be controlled by supplying a control signal at its terminal 4. A heating element 3 is connected between the terminal A and terminal MT2 of the switch 2. The other terminal MT1 of the switch 2 is connected to a current sensing means 7 which in turn is connected to the terminal B. This current sensing means 7 my take the form of a resistor, however other forms of current sensing means are possible such as a current transformer. The switch 2 may be switched on in response to an appropriate control signal on the control terminal 4 supplied by a switch control circuit 10. Depending upon whether the temperature of the heating element is too cold or too hot respectively this control circuit 10 will cause the switch to be closed or not. The switch 2 in turn switches on or off the alternating current flowing through the heating element 3. The heating element 3 is made of material having a high positive temperature coefficient of resistance (PTC) i.e. its ohmic resistance increases with an increase in temperature. As a consequence when the switch 2 is on the alternating voltage on the terminal B of the current sensing resistor 7 is a function of the temperature of the heating element 3.

The circuit arrangement also has a scaling circuit 8 consisting of a resistor 8a and variable resistor 8b connected across terminals A and B and having an output 6 with respect to terminal B. The variable resistor 8b may be adjusted by a user so that the alternating voltage on the output 6 corresponds to the desired temperature of the heating element 3 selected by the user. That is, the magnitude of the voltage across resistor 8b will become equal to that across resistor 7.

The resistors 8a and 8b of the scaling means 8 form two branches of a wheatstone bridge respectively. The current sensing resistor 7 and the heating element 3 forming the other two branches respectively of the bridge. This wheatstone bridge arrangement is powered by the alternating current mains source 1 and has outputs 6 and 5 with respect to terminal B. The bridge balance point occurs when the temperature set by the user by means of the scaling means 8 is equivalent to the temperature of the heating element 3 as measured by the current sensing resistor 7. At this bridge balance point the bridge has a zero output. As both the voltages with respect to terminal B at the output 6 of the scaling circuit 8 and at the output 5 of the current sensing resistor 7 are proportional to the voltage of the alternating current mains source 1, the operation of the circuit arrangement is not influenced by variations in the mains voltage.

The circuit arrangement has a comparator 9 having inputs 11 and 12 which are respectively connected to the output 6 of the scaling circuit 8 and the output 5. In this way the comparator 9 receives an input voltage which is the vector sum of the voltages across resistor 8b and the current sensor resistor 7. The comparator 9 also has an output 13 which is in turn connected to one input of an AND gate 18. This comparator 9 serves as the bridge detector, and when power is applied to the heating element 3, the comparator 9 will output a logic signal in which the logic HIGH level will change by 180 degrees of phase with respect to the phase of the mains voltage as a reference. That is, a logic HIGH during positive half cycles of the mains will move to Logic HIGH during negative half cycles of the mains as the heating element temperature crosses the desired set temperature.

Figure 2A:
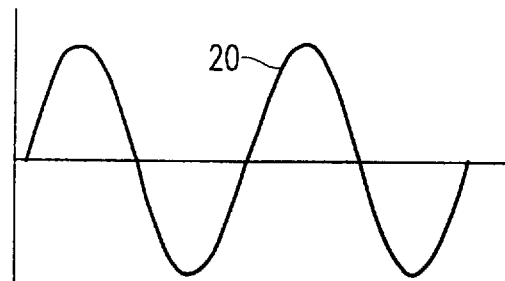
FIGS. 2a, 2b, 2c, 2d, 2e, 2f, 2g show waveforms related to the operation of the circuit arrangement of FIG. 1. For convenience all waveforms are referenced to the circuit node at the junction of the switching means and the current sensing means. This node is labelled 5 in FIG. 1 and will also be used as the reference for all signals unless otherwise stated.
Figure 2B:
Figure 2C:
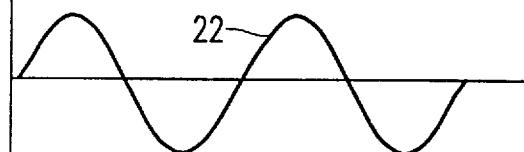
Figure 2D:
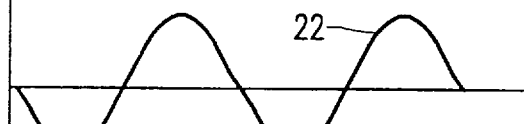
Figure 2E:
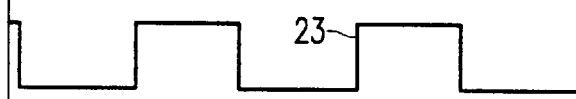
Figure 2F:

When the heating element 3 is conducting and the temperature of the heating element is less than the set temperature, then the signal 22 (see FIG. 2d) at the output 6 of the scaling means 8 is out of phase with the AC mains (see FIG. 2a). When the heating element 3 is conducting and the temperature of the heating element 3 is greater than the set temperature then the signal 22 (see FIG. 2c) at the output 6 of the scaling means 8 is in phase with the AC mains (see FIG. 2a). The reason for this change of phase is that the output 6 of the scaling means forms one of the outputs of a wheatstone bridge, the other output of the bridge being the output of the current sensor resistor 7. These two signals are arranged to be equal in magnitude when the bridge is balanced. When the bridge is unbalanced the difference in their magnitude constitutes the bridge output signal and this difference signal will have the phase of whichever voltage is the larger. In addition, when the heating element 3 is not conducting, the signal 22 (see FIG. 2c) at the output 6 of the scaling means is simply the chosen fraction of the mains unmodified by the current sensor voltage, and is therefore in phase with the AC mains (see FIG. 2a). In this circuit arrangement the comparator 9 acts as a phase discriminator for detecting the phase of the signal at the output 6 of the scaling means a as compared to the reference signal present at the output 5 of the current sensor resistor 7. The comparator 9 outputs a HiGH when the voltage on the terminal 11 is less than the voltage of the reference signal on the terminal 12, otherwise it outputs a LOW. As such when the heating element 3 is too hot or is not conducting the comparator 9 will output a signal 23 as shown in FIG. 2e. On the other hand when the heating element 3 is conducting and is too cold the comparator 9 outputs a signal 23 as shown in FIG. 2f. The signals 23 shown in FIGS. 2e and 2f are 180 degrees out of phase with each other.

The circuit arrangement has a further comparator 16 having inputs 18a and 18b respectively connected to terminal B and to a voltage source 19. The comparator 16 has an output 14 coupled to the other input of the AND gate 18. The voltage source 19 is in turn connected to the output 5.

In this circuit arrangement, the comparator 16 detects whether or not there is any alternating current passing through the heating element 3. As soon as the heating element 3 begins to conduct there is an alternating signal present on the terminal 18a due to the output voltage from the current sensor resistor 7. The alternating voltage at output 5, offsetted by voltage V of the voltage source 19, is supplied to terminal 18b of the comparator 16. This comparator 16 outputs a HIGH when the voltage on the terminal 18a is less than the voltage of the offsetted alternating voltage the terminal 18b, otherwise it outputs a LOW. As such when the heating element 3 is conducting the comparator 16 outputs a signal 21 as shown in FIG. 2b. On the other hand when the heating element 3 is not conducting there will be no alternating voltage across the input terminals of the comparator 16 and the output of the comparator 16 will always be LOW. Due to the offset voltage V of the Voltage Source 19, the beginning and end of the HIGH outputted by the comparator 16 does not exactly coincide with the beginning or end of the negative half cycle of the AC mains 20 (see FIG. 2a). The HIGH begins where the voltage of the negative half cycle of the AC mains 20 is less than the offset voltage V. The reason for including an offset voltage source is that comparators are not perfect and the inclusion of such a source will eliminate any possibility of erroneous output signals from the comparator 16. Thus during the time the heating element 3 is conducting the comparator 16 outputs a periodic waveform 21 (FIG. 2b) alternating between HIGH and LOW and during the time it is not conducting the comparator 16 always outputs a LOW.

Figure 2G:
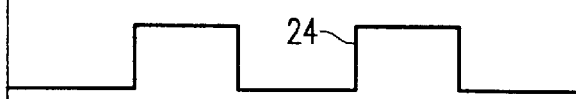

The signals 21 and 23 are fed to the inputs of the logic AND gate 18. The output of the AND gate 18 is in turn connected to the reset input 17a of a logic latch 17. When the heating element 3 is conducting and is too hot, the HIGH of signal 23 as shown in FIG. 2e (which is a result of the heating element being too hot) coincides with the HIGH of the signal 21 as shown in FIG. 2b (which is a result of heating element conducting) and the AND gate will Output a signal 24 having a HIGH as shown in FIG. 2g to the reset input 17a of the latch 17. In the event the heating element is conducting and is too cold, the HIGH of signal 21 as shown in FIG. 2b (which is a result of the heating element conducting) coincides with the LOW of signal 23 as shown in FIG. 2f (which is the result of the heating element being too cold) and the AND gate 18 will output only a LOW to the reset input 17a of the latch 17. Lastly, in the event the heating element is not conducting the comparator 16 always outputs a LOW to the AND gate 18 which will in turn always output a LOW to the reset input 17a of the latch 17.

As will be noticed from FIGS. 2b, 2e, 2f and 29 it takes less than one complete cycle of the AC mains for the logic AND gate 18 to process the outputs from the comparators 9 and 16 and detect whether the heating element 3 is too cold or too hot.

The circuit arrangement shown in FIG. 1 has a timer 15 which may be in the form of an integrated circuit. This timer 15 generates periodic pulses having a predetermined pulse duration and pulse period and outputs these pulses to the set input 17b of the logic latch 17. The use of an integrated circuit timer enables the pulse duration and period to be selected to meet the application requirements. The period of the pulse is predetermined and depends on the thermal time constant of the heating element 3. In this embodiment the pulse duration is 200 microseconds and the pulse period set at 20 seconds. Depending on the thermal characteristics of the application, the pulse period may be in most cases 10 to 40 seconds, although periods as short as one second, and periods longer than 600 seconds may also be optimum in specific applications, when other issues need to be considered as well.

The logic latch 17 is always set to an ON state in response to a pulse (HIGH) from the timer 15. Except while there is a pulse on the set input 17b, the latch 17 is reset to an OFF state in response to a HIGH from the AND gate 18. When there is no pulse (LOW) on the set input 17a and there is a LOW on the reset input 17a, the latch 17 will remain in it's previous state. Such a logic latch 17 may be in the form of a pair of cross coupled NAND gates. The logic truth table for this latch 17 is as follows

| Pulse<br>Set Input 17b | Output from AND 18<br>Reset Input 17a | State of Latch |
| --- | --- | --- |
| HIGH | LOW | ON |
| HIGH | HIGH | ON |
| LOW | HIGH | OFF |
| LOW | LOW | Previous state. |

In this embodiment, the pulse (HIGH) overrides a HIGH or LOW on the reset input of the logic latch 17. In an alternative embodiment the reset input may override the set input of the logic latch 17.

The output of the latch 17 is connected to the input 10a of the switch control circuit 10 which in turn is connected to the switch 2. When the latch 17 is in an ON state, the switch control circuit 10 is in turn in an ON state and consequently the switch 2 is ON and alternating current flows through the heating element 3. When the latch 17 is in an OFF state the switch control circuit 10 is in turn in an OFF state and consequently the switch 2 will turn OFF and no alternating current flows through the heating element 3.

The description of the operation of the circuit is as follows.

The circuit arrangement is turned on by means not shown and the alternating current mains source 1 supplies power to terminals A and B. The user selects the desired temperature of the heating element 3 by adjusting the variable resistor 8b of the scaling means 8. After power is turned on, the timer 15 begins supplying pulses to the set input 17b of the latch 17 having a duration and repetition rate as required by the application. In this example these pulses have a duration of 200 microseconds, which is a fraction of the AC mains cycle. The first pulse sets the latch 17 to an ON state and the latch 17 remains ON during that pulse. After the pulse has ceased the latch 17 will remain in the ON state until it is reset. The latch 17 in this ON state will turn the switch control circuit 10 to an ON state which in turn will turn the switch 2 ON. In this ON state the switch 2 conducts alternating current though the heating element 3 and the heating element 3 begins to heat up. Any further pulses from the timer when the latch 17 is in the ON state will not effect the state of the latch 17. The latch will remain ON and in turn the heating element 3 will remain conducting.

Some time after this the heating element 3 will reach and slightly exceed the set temperature. In this situation, the AND gate 18 outputs a HIGH to the reset input 17a of the latch 17 which changes the state of the latch to OFF. This in turn, switches off the switch control circuit 10 which opens the switch 2 and consequently switches off the alternating current passing through the heating element 3. The heating element 3 now begins to cool down.

When the timer period expires a pulse is supplied by the timer 15 to the set input of the latch 17 which changes the state of the latch 17 to ON. The latch 17 will remain in the ON state after the pulse has ceased until it is reset. This will in turn switch on the switch control circuit 10 and close switch 2 so alternating current again passes through the heating element 3. The heating element begins to heat up again. Once the heating element 3 becomes too hot again the latch 17 is reset as before.

In the event the pulse is supplied to the set input 17b of the latch immediately after the heating element is turned off and the heating element 3 is still too hot after the pulse ceases, the AND gate 18 will reset the latch 17 at less than one cycle of AC mains after the pulse has ceased. Thus in practice the smallest "on" time of the switch 2 and heating element 3 for measuring the temperature of the heating element is less than one AC mains cycle.

From reading the present disclosure, other variations will be apparent to persons skilled in the art. Such variations may involve other features which are already known in controlling heating elements and which may be used instead of or in addition to features already described herein. In particular the invention envisages many different configurations of the components of the logic means whilst still performing the same functional logic.

We claim:

1. A circuit arrangement for controlling the temperature of a heating element, the resistance of which heating element is a function of its temperature, the circuit comprising:

means for coupling an alternating current mains supply to the heating element for supplying an alternating current to the heating element via a switching means, a switch control circuit having an output to control the switching means, wherein the switching means conducts the alternating current to the heating element when the switch control circuit is in an ON state and does not conduct when the switch control circuit is in an OFF state, a current sensor means coupled to the heating element, the current sensor means supplying at an output thereof an alternating voltage, which is dependent on the alternating current passing through the heating element and representative of the temperature of the heating element, a scaling means having means for a user to select a desired temperature of the heating element, the scaling means adapted to supply to an output thereof an alternating voltage, which is dependent on a temperature selected by the user, a timing circuit for supplying timing pulses, the timing pulses having a predetermined pulse duration and pulse period, a first detector means having respective inputs coupled to the outputs of the current sensor means and the scaling means and adapted to supply a first logic control signal when the temperature of the heating element exceeds the temperature set by the user, a second detector means for supplying a second logic control signal when said alternating current is supplied to the heating element, a logic means adapted to set the switch control circuit to the ON state always in response to the timing pulses and to reset the switch control circuit to the OFF state in response to the logic AND combination of the first and second logic control signals, and wherein a Wheatstone bridae arrangement is created which has a balance point equivalent to said temperature selected by the user, and which has a first branch comprising the heating element, a second branch comprising the current sensor means, a third branch comprising the means for a user to select a desired temperature, and a fourth branch comprising a resistor which is part of the scaling means and wherein one input of said first detector means is coupled to the junction of the third and fourth branches and the other input of the first detector means is coupled to the junction of the first and second branches.

2. A circuit arrangement as claimed in claim 1, wherein the pulse duration of the timing pulses is less than one half cycle of the AC mains.

3. A circuit arrangement as claimed in claim 1 wherein the smallest time the first and second detector means take to process and output the first and second control signal is one cycle of the AC mains.

4. A circuit arrangement as claimed claim 1, wherein the logic means comprises an AND gate having one input coupled to the first detector means for receiving the first logic control signal and having another input coupled to the second detector means for receiving the second logic control signal, a logic latch having a reset input coupled to the output of said AND gate and having a set input coupled to the timing circuit for receiving said timing pulses.

5. A circuit arrangement as claimed in claim 1, wherein the first detector means comprises a phase comparator having respective inputs coupled to the outputs the current sensor means and scaling means and which is adapted to supply the first logic control signal when the temperature of the heating element exceeds the temperature set by the user and to supply a third logic control signal when the temperature of the heating element does not exceed the temperature set by the user.

6. A circuit arrangement as claimed in claim 4, wherein the first detector means comprises a phase comparator having respective inputs coupled to the outputs of the current sensor means and the scaling means and which is adapted to supply the first logic control signal when the temperature of the heating element exceeds the temperature set by the user and to supply a third logic control signal when the temperature of the heating element does not exceed the temperature set by the user.

7. A circuit arrangement as claimed in claim 1, wherein the first detector means comprises a phase comparator having respective inputs coupled to the outputs of the current sensor means and the scaling means and which is adapted to supply the first logic control signal when the temperature of the heating element exceeds the temperature set by the user and to supply a third logic control signal when the temperature of the heating element does not exceed the temperature set by the user.

* * * * *